United States Patent [19]
Simpson

[11] Patent Number: 6,047,909
[45] Date of Patent: *Apr. 11, 2000

[54] HOPPER DISCHARGE AND PATTERN CONTROLLING APPARATUS FOR A BROADCAST SPREADER

[75] Inventor: Dennis L. Simpson, Marysville, Ohio

[73] Assignee: White Castle System, Inc., Columbus, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/977,705

[22] Filed: Nov. 25, 1997

Related U.S. Application Data

[60] Provisional application No. 60/032,054, Nov. 25, 1996.

[51] Int. Cl.⁷ ................................................. A01C 17/00
[52] U.S. Cl. ........................................... 239/687; 239/600
[58] Field of Search ..................... 239/600, 650, 239/665, 666, 681, 687, 688; 222/311, 315, 410, 485, 486, 561

[56] References Cited

U.S. PATENT DOCUMENTS

| | | | |
|---|---|---|---|
| 2,594,084 | 4/1952 | Skibbe et al. | 275/8 |
| 2,632,651 | 3/1953 | Rittenhouse | 239/687 |
| 2,975,578 | 3/1961 | Drauden et al. | 239/687 |
| 3,232,458 | 2/1966 | Freeman | 239/681 |
| 3,383,055 | 5/1968 | Speicher | 239/687 |
| 3,441,224 | 4/1969 | Cotter et al. | 239/656 |
| 3,523,648 | 8/1970 | Garber | 239/668 |
| 4,032,074 | 6/1977 | Amerine | 239/685 |
| 4,081,142 | 3/1978 | Harderup | 239/687 |
| 4,106,704 | 8/1978 | McRoskey et al. | 239/687 |
| 4,351,481 | 9/1982 | Dreyer | 239/670 |
| 4,511,090 | 4/1985 | Morgan | 239/666 |
| 4,529,337 | 7/1985 | Hilgraf et al. | 406/163 |
| 4,548,362 | 10/1985 | Doering | 239/685 |
| 4,588,133 | 5/1986 | Brabb et al. | 239/681 |
| 4,597,531 | 7/1986 | Kise | 239/650 |
| 4,681,265 | 7/1987 | Brabb et al. | 239/665 |
| 4,834,296 | 5/1989 | Van Der Lely et al. | 239/687 |
| 4,867,381 | 9/1989 | Speicher | 239/665 |
| 5,046,664 | 9/1991 | Van Der Lely et al. | 239/687 |
| 5,145,116 | 9/1992 | Shaver | 239/665 |
| 5,203,510 | 4/1993 | Courtney et al. | 239/667 |
| 5,294,060 | 3/1994 | Thompson | 239/656 |
| 5,340,033 | 8/1994 | Whitell | 239/676 |

*Primary Examiner*—Lesley D. Morris
*Assistant Examiner*—Lisa Ann Douglas
*Attorney, Agent, or Firm*—Porter, Wright, Morris & Arthur, LLP

[57] ABSTRACT

A choke plate or damper is removably mounted in the bottom of the broadcast spreader hopper. The choke plate is formed with three apertures, each of which is surrounded by a boss which, with the choke plate in an operative position, projects through a material discharge outlet in the hopper bottom for sliding engagement with a shutter plate slidably mounted on a rear underside portion of the hopper. A deflector is slidably mounted on a forward underside portion of the hopper and is formed with a rearwardly projecting and downwardly inclined portion that, as the deflector is adjusted, moves between positions of greater and lesser interposition between the hopper outlet and a rotary impeller disposed therebelow.

17 Claims, 5 Drawing Sheets

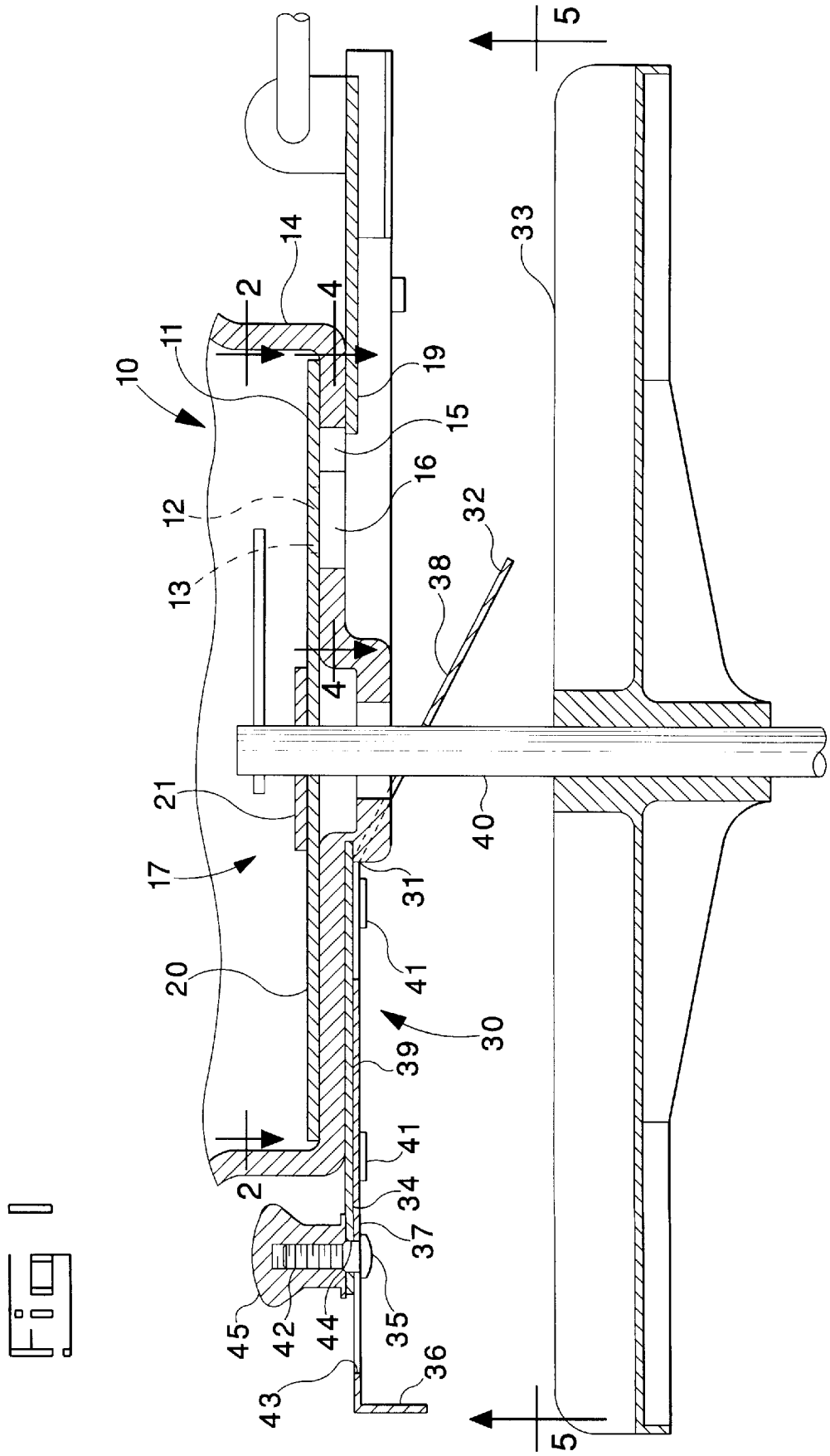

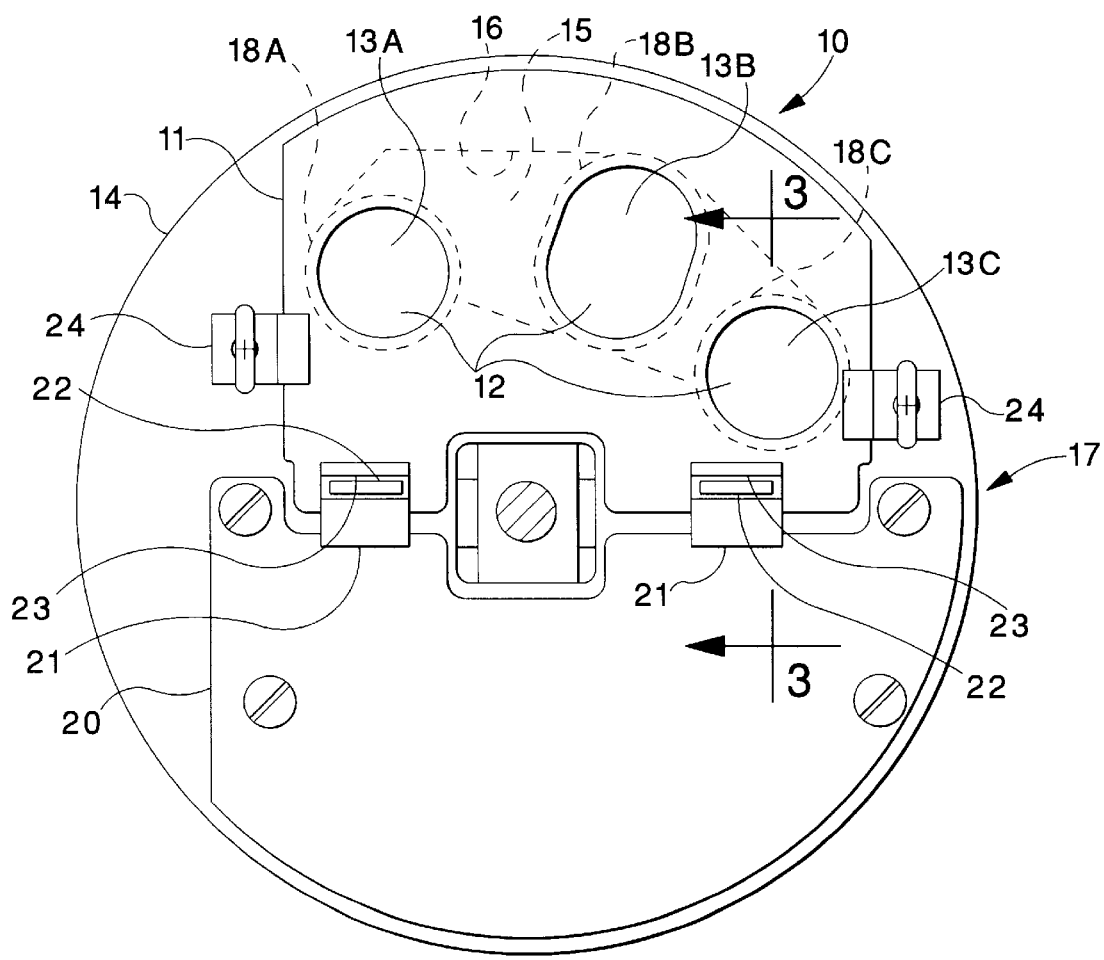

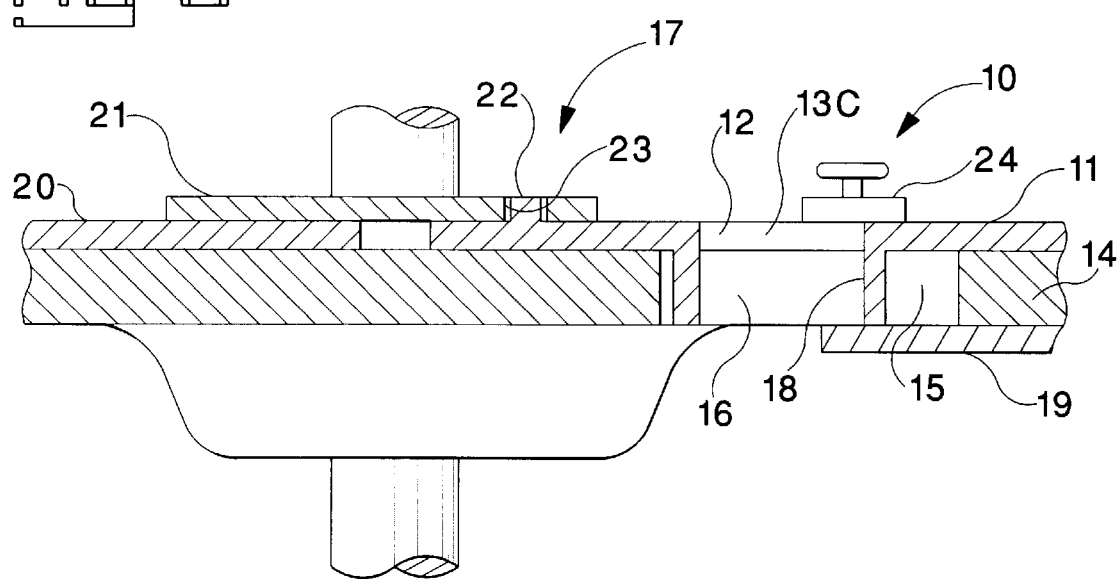
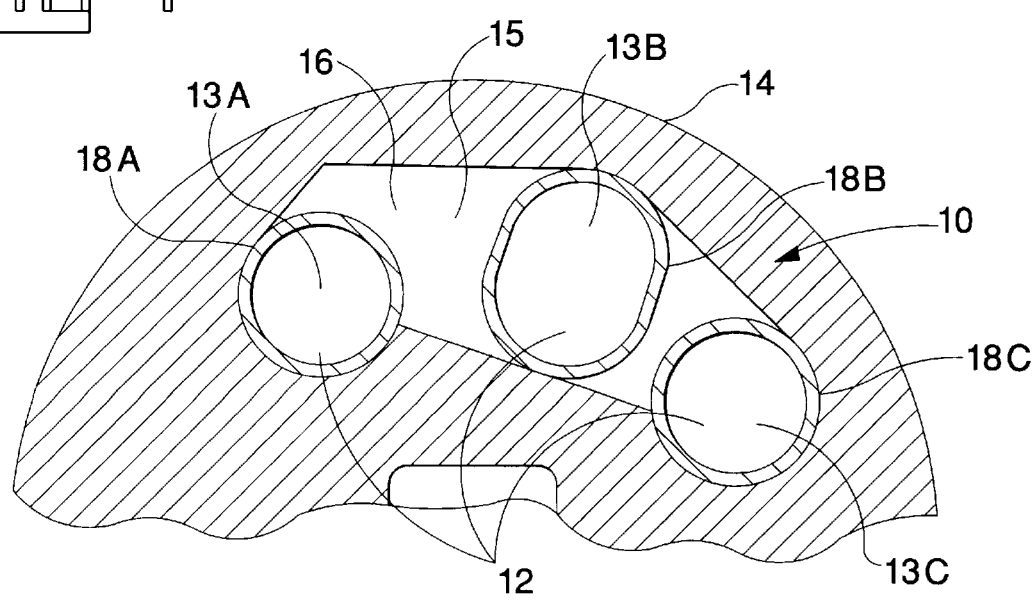

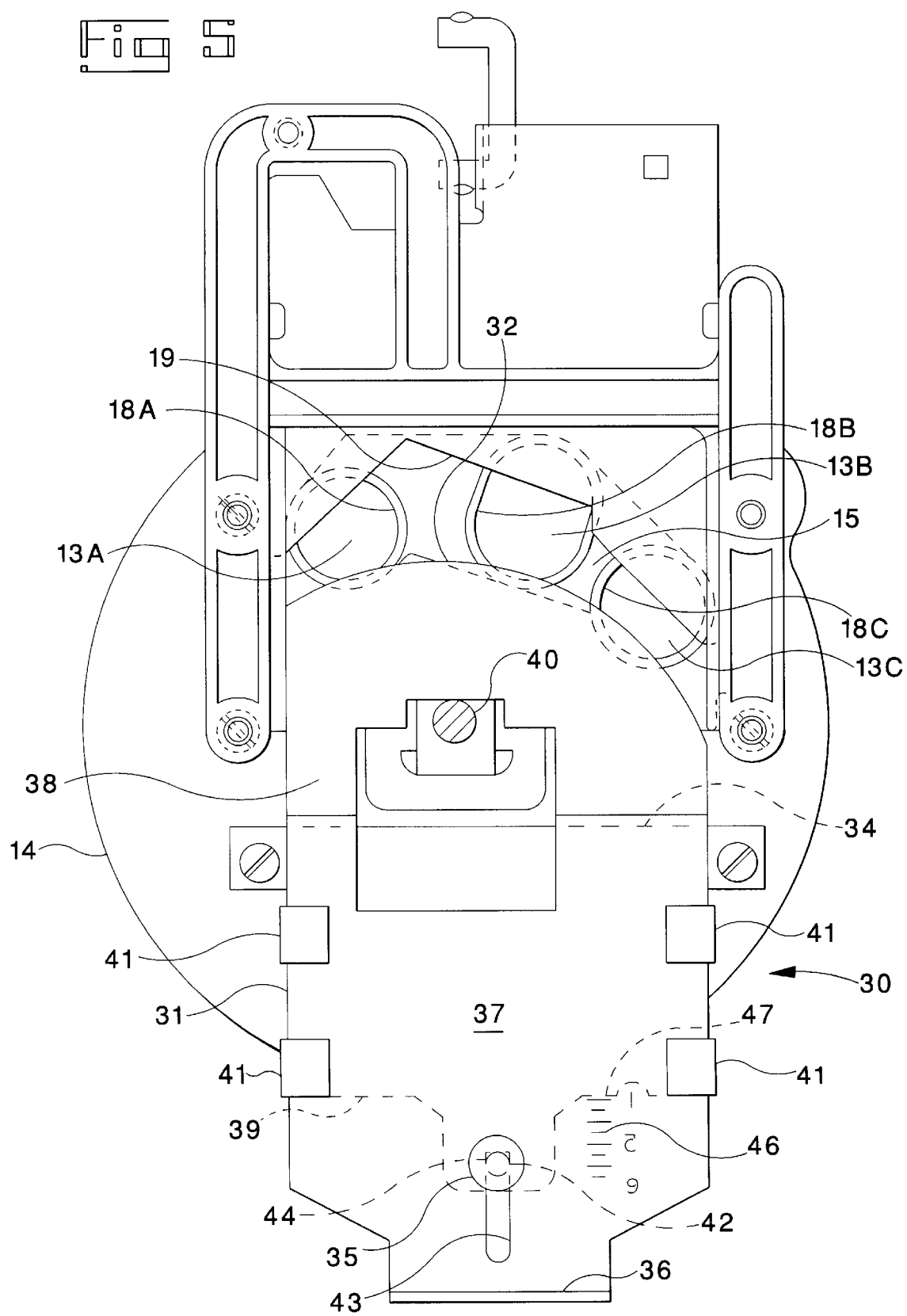

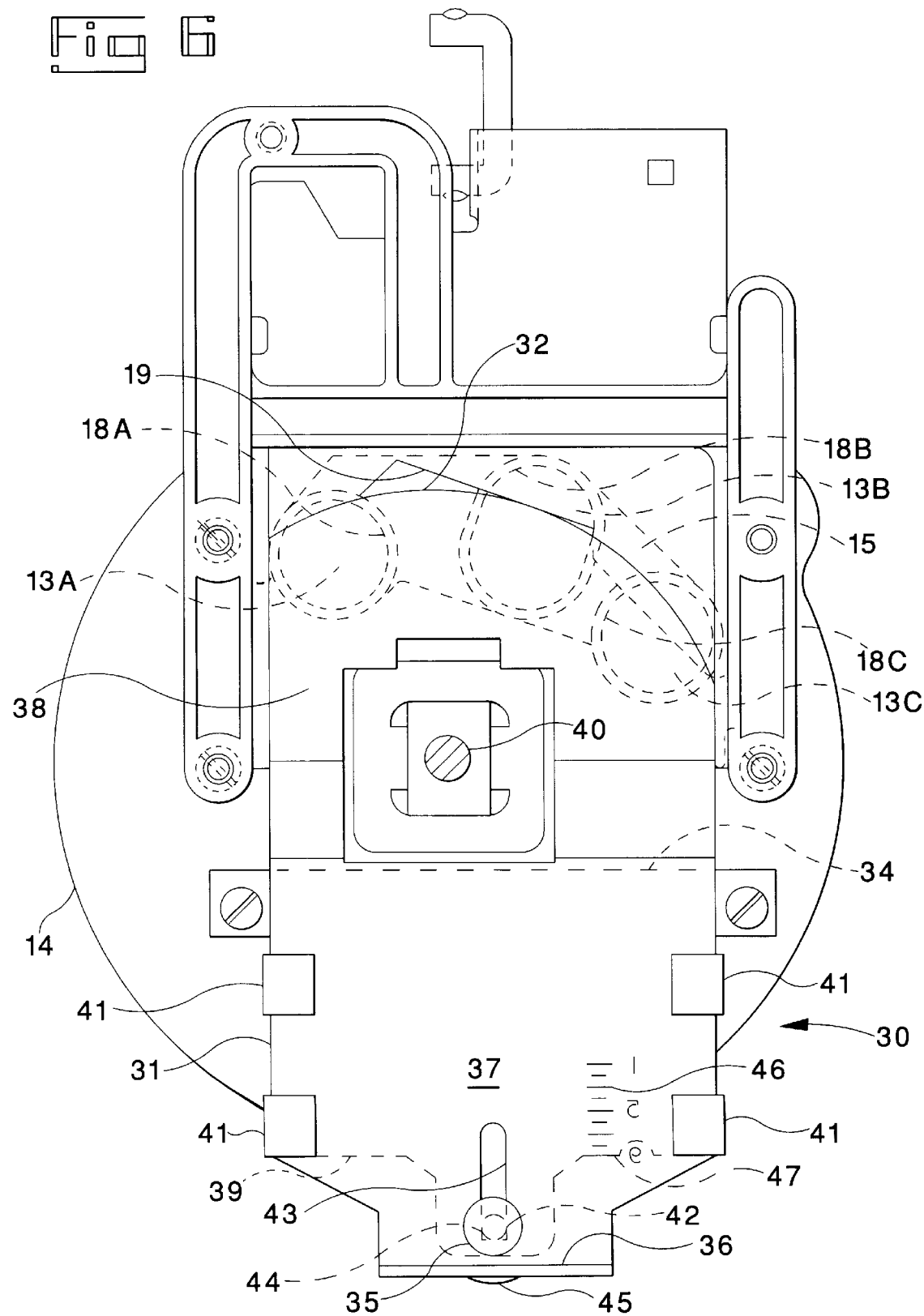

HOPPER DISCHARGE AND PATTERN CONTROLLING APPARATUS FOR A BROADCAST SPREADER

RELATED APPLICATION

This application claims the benefit of U.S. Provisional Application No. 60/032,054, filed Nov. 25, 1996 which Provisional Application is now abandoned.

BACKGROUND OF THE INVENTION

The present invention relates to broadcast spreaders for particulate materials, such as fertilizer, and more particularly to hopper discharge and pattern controlling components thereon.

It is important for a broadcast spreader to provide predictable and generally even distribution patterns and application rates. The shape and the size of the area of ground covered as the spreader advances need to be what the operator expects them to be, and the amount of material laid down in any selected location covered by the spreader needs to be substantially the same as the amount laid down in every other location.

Another performance attribute is versatility, both in terms of the spreader being suitable for use with a wide variety of materials and in terms of its being able to provide a wide range of application rates. Heretofore, however, versatility beyond a conventional range of materials a and/or flow rates could not be obtained without a significant loss in the predictability and evenness of distribution. Larger sized or more densely applied particulate materials such as lime, sand, ice melting products and some agricultural fertilizers were particularly troublesome for conventional spreaders known to the present inventor. Such substances could only be applied, if at all, by making several passes over the ground to be covered or by allowing for a relatively skewed distribution pattern. Thus, the present inventor was faced with the problem of devising a broadcast spreader that would provide predicable and even distribution patterns and rates, not only for conventional materials, but also for larger and more densely applied particulates.

SUMMARY OF THE INVENTION

The present invention is directed to hopper discharge apparatus for a broadcast spreader equipped with a hopper, a shutter plate slidably mounted on the hopper and a rotary impeller disposed below and in spaced relation to the hopper and the shutter plate. The present invention basically comprises an optional choke plate provided with a first discharge area defined by at least one aperture, the hopper being provided with a second discharge area which exceeds the first discharge area in size and which is defined by at least one outlet, and means for removably mounting the choke plate in an operative position within the hopper wherein the first discharge area on the choke plate is aligned with said at least one outlet in the hopper. Preferably, the present invention also comprises a deflector slidably mounted on a portion of the hopper remote from the shutter plate. The deflector is movable between positions of lesser and greater interposition between the at least one outlet in the hopper and the rotary impeller.

Primary objects of the present invention are providing predictable and even distribution patterns and rates, not only for lawn fertilizers and other conventional materials, but also for larger and more densely applied particulates. Additional objects and advantages of the present invention may be apparent in light of the following drawing and detailed description of the preferred embodiment.

BRIEF DESCRIPTION OF THE DRAWING

FIG. 1 is a fragmentary sectional view of pertinent portions of a material spreader equipped with hopper discharge and pattern controlling apparatus according to the present invention;

FIG. 2 is a fragmentary top plan view taken along line 2—2 of FIG. 1 of a choke plate according to the present invention disposed in the bottom of a hopper;

FIG. 3 is an enlarged, fragmentary sectional view taken along line 3—3 of FIG. 2 and particularly illustrates a preferred manner of attaching the subject choke plate to the hopper and a preferred manner in which portions of the choke plate are seated in the hopper;

FIG. 4 is a fragmentary sectional view taken along line 4—4 of FIG. 1 and particularly illustrates the spatial relationships between aperture-surrounding bosses of the choke plate and the hopper outlet;

FIG. 5 is a horizontal sectional view taken along line 5—5 of FIG. 1 and particularly illustrates a pattern controlling deflector according to the present invention in a relatively forward position; and FIG. 6 is a horizontal sectional view similar to FIG. 5 wherein the subject pattern controlling deflector is disposed in a relatively rearward position.

DETAILED DESCRIPTION OF THE PREFERRED EMBODIMENT

As illustrated in FIGS. 1–4, hopper discharge apparatus, generally designated 10, according to the present invention basically comprises a choke or damper plate 11 provided with a first discharge area 12 defined by at least one aperture 13; a hopper 14 provided with a second discharge area 15 exceeding the first discharge area 12 in size and defined by at least one outlet 16; and means, generally designated 17, for mounting the choke plate 11 within the hopper 14 in such a manner that the first discharge area 12 is aligned with the second discharge area 15.

As illustrated in FIGS. 2 and 4, three apertures 13A–13C are preferably provided in the choke plate 11, and bosses or chutes 18A–18C are disposed in surrounding relation to the respective apertures 13A–13C on the underside of the choke 11. The choke apertures 13A–13C are sized and positioned to correspond to the discharge ports formed in the hopper bottom of a conventional BIGFOOT® model broadcast spreader manufactured by PSB Division of White Castle System, Inc., Columbus, Ohio. As indicated in FIG. 3, the aperture-surrounding bosses 18A–18C project from the underside of the choke plate 11 a distance equal to the thickness of the hopper bottom wall 14. In this manner, the flow rate of material through the apertures 13A–13C may be effectively controlled by a conventional variable position shutter 19 mounted on a rear underside portion of the hopper.

As illustrated in FIGS. 2 and 4, a single outlet 16 in the hopper bottom wall 14 defines the second discharge area 15. Opposite lateral ends of the outlet 16 are positioned and shaped to receive, and are slightly larger in radius than, the distal surfaces of the outer bosses 18A and 18C projecting from the choke plate 11. A mid region of the outlet 16 is slightly greater than the distance between the outer radial surfaces of the oblong boss 18B surrounding the middle aperture 13B. Thus, the three bosses 18A–18C on the choke plate 11 may be received in the hopper outlet 16, and the area of the subject hopper outlet 16 is generally equal to the combined areas occupied by the bosses 18A–18C and by the spaces therebetween. In this manner the rearwardly mounted, rate controlling shutter 19 (FIGS. 1, 5 and 6) employed on the conventional BIGFOOT® spreader may be used effectively with the hopper outlet 16, whether or not the choke plate 11 is mounted thereon.

As illustrated in FIGS. 2 and 3, the means 17 for mounting the choke plate 11 within the hopper 14 comprises an anchor plate 20 secured to a relatively forwardly disposed portion of the hopper bottom, a pair of relatively spaced apart bridges 21 extending between the anchor plate 20 and the choke plate 11, a pair of tabs 22 projecting upwardly from the choke plate 11 in alignment with a tab-receiving slot 23 in each of the bridges 21, and a pair of hand-tightened clamps 24 mounted on the hopper bottom 14 on opposite sides of the choke plate 11. In this manner, the choke plate 11 may be readily connected to and disconnected from the mounting means 17. Alternatively, hinges (not shown) may be substituted for the bridges 21 so that the choke plate 11 is pivotally mounted on the anchor plate 20 and may be flipped over onto the anchor plate when not in use. It would also be feasible to eliminate the anchor plate 20 in favor of ridges or insets (not shown) mounted or formed on the hopper bottom 14 to properly position the choke plate 11 thereon.

As illustrated in FIGS. 1, 5 and 6, the pattern controlling apparatus, generally designated 30, basically comprises a deflector 31 having a material engaging portion 32 disposed between the hopper outlet 16 and a rotary impeller 33, a bracket 34 for slidably mounting the deflector 31 under the hopper 14, and locking means 35 for releasably securing the deflector 31 to the bracket 34 in a selected position. The deflector 31 is formed at its forwardmost end with a downturned flange 36 which the operator may grasp to slide the deflector to the desired position. A mid-region of the deflector defines a generally horizontally disposed mounting portion 37 which cooperates with the bracket 34 and the locking means 35 in a manner described below, and a rearward portion 38 of the deflector is downwardly inclined and includes the material engaging portion 32 at and adjacent to a free end thereof. The bracket 34 comprises a planar body 39 mounted on the underside of the hopper 14 forwardly of a shaft 40 extending between the impeller 33 and the hopper and a pair of deflector mounting flanges 41 on opposite sides of the body 39. The locking means 35 comprises a carriage bolt 42, a bolt-receiving slot 43 formed in the mounting portion 37 of the deflector 31, a square hole 44 formed in the bracket body 39 for receiving the square shank of the carriage bolt 42, and a threaded knob 45. A reference scale 46 is stamped or otherwise applied the deflector mounting portion 37 in an area below a forward edge 47 of the bracket body 39.

MODE OF OPERATION

If the desired particulate material is lime, sand, an ice melt product or an agricultural fertilizer whose size or weight or desired application rate exceeds standard parameters for a conventional broadcast spreader, the following procedure may be employed with the present hopper discharge and pattern controlling apparatus. The operator loosens the clamps 24 on opposite sides of the choke plate 11, turns the clamps away from the choke plate and retightens them. Then, the rearwardmost end of the choke plate is pivoted upwardly, thereby freeing the tabs 22 on the forward end of the choke plate from the bridge slots 23, and the choke plate is removed from the hopper 14 and stored for future use.

With the shutter 19 in a fully closed position, the hopper is filled with the desired particulate material. The operator adjusts a conventional shutter control (not shown) so that, when a conventional shutter lever (not shown) is engaged, the shutter 19 will be in a half opened position. Then, the threaded knob 45 at the front of the hopper 14 is loosened, the deflector 31 is placed in a middle position, as defined by the intersection of the reference scale 46 and the edge 47 of the mounting bracket 34. The knob 45 is then retightened. A short test run is made over a surface from which the material can be easily removed. The operator notes the shape of the distribution pattern and the amount of material deposited on the test surface. If the pattern is skewed to the left, the deflector 31 is reset to a more forwardly disposed position so that the drop point will be closer to the center of the impeller 33. If the pattern is skewed to the right, the deflector is reset to a more rearwardly disposed position so that the drop point will be closer to the tips of the impeller. The foregoing adjustments are based upon the observation that heavier and larger materials remain upon a rotating impeller a shorter amount of time than lighter and small particles, given the same drop point on the impeller. If insufficient material has been deposited, the operator adjusts the shutter control so that a larger portion of the hopper outlet 16 is available to discharge material when the shutter lever is pulled. If too much material has been deposited, the shutter control is adjusted in the opposite direction. Additional test runs are conducted as needed until the desired pattern and quantity of deposited material are obtained. The operator then records the shutter control and the deflector reference scale 46 settings which provide the proper pattern and quantity for the particular material to be applied and proceeds to apply it in a desired location in a conventional fashion.

If the desired material is such that it can be properly applied by a conventional spreader or if the material is composed of relatively small or mid-sized particles or is to be applied at low or mid-level rates, the following procedure may be followed. The operator removes material left in the bottom of the hopper 14 from previous applications, retrieves the choke plate 11 from its storage location, and angles the tabs 22 on the forward end of the choke plate into the bridge slots 23. The rear end of the choke plate is then lowered to the hopper bottom, with the aperture bosses 18A–18C of the plate seated in the hopper outlet 16. The clamps 24 are loosened, turned inwardly over the opposing edges of the choke plate and retightened. With the shutter 19 in its fully closed position, the hopper 14 is filled with the desired material. The operator then adjusts the shutter control to the recommended setting. The locking knob 45 is loosened, the deflector 31 is adjusted to its rearwardmost position (reference scale setting '9' in FIG. 6), and the knob 44 is retightened. A test run, as described above, is made to observe the actual distribution pattern and quantity applied, and adjustment of the shutter control and/or deflector 31 is made, if needed, to obtain the desired flow rate and distribution pattern. The operator then records any new settings for future reference and proceeds to apply the material to the desired location.

While a single preferred embodiment has been described and illustrated in substantial detail, the foregoing disclosure and drawing are not intended to unduly limit the spirit of the invention or the scope of tie following claims.

I claim:

1. Hopper discharge apparatus for a broadcast spreader equipped with a hopper stationarily mounted to the broadcast spreader, a shutter plate slidably mounted on an underside of the hopper and a rotary impeller disposed below and in spaced relation to the hopper and the shutter plate, said hopper discharge apparatus comprising:

an optional choke plate provided with a first discharge area defined by at least one aperture disposed inwardly of an outer perimeter of the choke plate;

the hopper being provided with a second discharge area exceeding the first discharge area in size and defined by at least one outlet; and means for removably mounting the choke plate in an operative position within the hopper, said means enabling the first discharge area on the choke plate to be aligned with said at least one outlet in the hopper.

2. The hopper discharge apparatus according to claim 1, wherein the first discharge area provided on the choke plate comprises three apertures, each of said apertures being defined by a boss disposed on an underside of the choke plate.

3. The hopper discharge apparatus according to claim 2, wherein, with the choke plate in the operative position, each of the bosses projects through said at least one outlet in the hopper.

4. The hopper discharge apparatus according to claim 3, wherein, with the choke plate in the operative position, each of the bosses is disposed for sliding engagement with the shutter plate on the hopper.

5. The hopper discharge apparatus according to claim 1, wherein the choke plate is readily removable from the means for mounting said choke plate within the hopper.

6. The hopper discharge apparatus according to claim 5, wherein the hopper has forward and rearward orientations and wherein the means for mounting the choke plate within the hopper comprises an anchor plate secured to the hopper forwardly of said at least one outlet in said hopper.

7. The hopper discharge apparatus according to claim 6, wherein at least one bridge projects rearwardly from the anchor plate, said bridge having a tab-receiving slot therein, and wherein the choke plate is provided with at least one tab mountable in the tab-receiving slot of said bridge.

8. The hopper discharge apparatus according to claim 5, wherein at least one choke plate-receiving clamp is mounted on the hopper.

9. The hopper discharge apparatus according to claim 1, wherein said at least one outlet in the hopper extends through a bottom wall in said hopper.

10. The hopper discharge apparatus according to claim 9, wherein the choke plate in the operative position is disposed in overlying relation to the bottom wall of the hopper.

11. The hopper discharge apparatus according to claim 1, wherein the shutter plate is mounted on the hopper outwardly of said at least one outlet in the hopper.

12. The hopper discharge apparatus according to claim 11, wherein said at least one outlet in the hopper is sized and positioned for selective occlusion by the shutter plate.

13. Hopper discharge apparatus for a broadcast spreader equipped with a hopper stationarily mounted to the broadcast spreader, a shutter plate slidably mounted on an underside of the hopper and a rotary impeller disposed below and in spaced relation to the hopper and the shutter plate, said hopper discharge apparatus comprising:

an optional choke plate provided with a first discharge area defined by at least one aperture disposed inwardly of an outer perimeter of the choke plate;

the hopper being provided with a second discharge area exceeding the first discharge area in size and defined by at least one outlet;

means for removably mounting the choke plate in an operative position within the hopper, said means enabling the first discharge area on the choke plate to be aligned with said at least one outlet in the hopper; and a deflector slidably mounted on a portion of the hopper remote from the shutter plate, said deflector being movable between positions of lesser and greater interposition between said at least one outlet in the hopper and the rotary impeller.

14. The hopper discharge apparatus according to claim 13, which further comprises means for securing the deflector in a selected position.

15. The hopper discharge apparatus according to claim 14, wherein the means for securing the deflector in a selected position are manually operable.

16. The hopper discharge apparatus according to claim 13, wherein a base portion of the deflector is formed with a slot and is slidably mounted on a bracket plate secured to the hopper and wherein a threaded shaft extends through the bracket plate and the slot in the deflector and is provided with a cooperatively threaded knob thereon.

17. The hopper discharge apparatus according to claim 16, wherein the deflector is formed with a free end portion projecting from the base portion at a downwardly inclined angle.

* * * * *